Oct. 25, 1949.   I. E. GROSDOFF   2,485,825
COMPUTING CIRCUITS
Filed Jan. 18, 1944
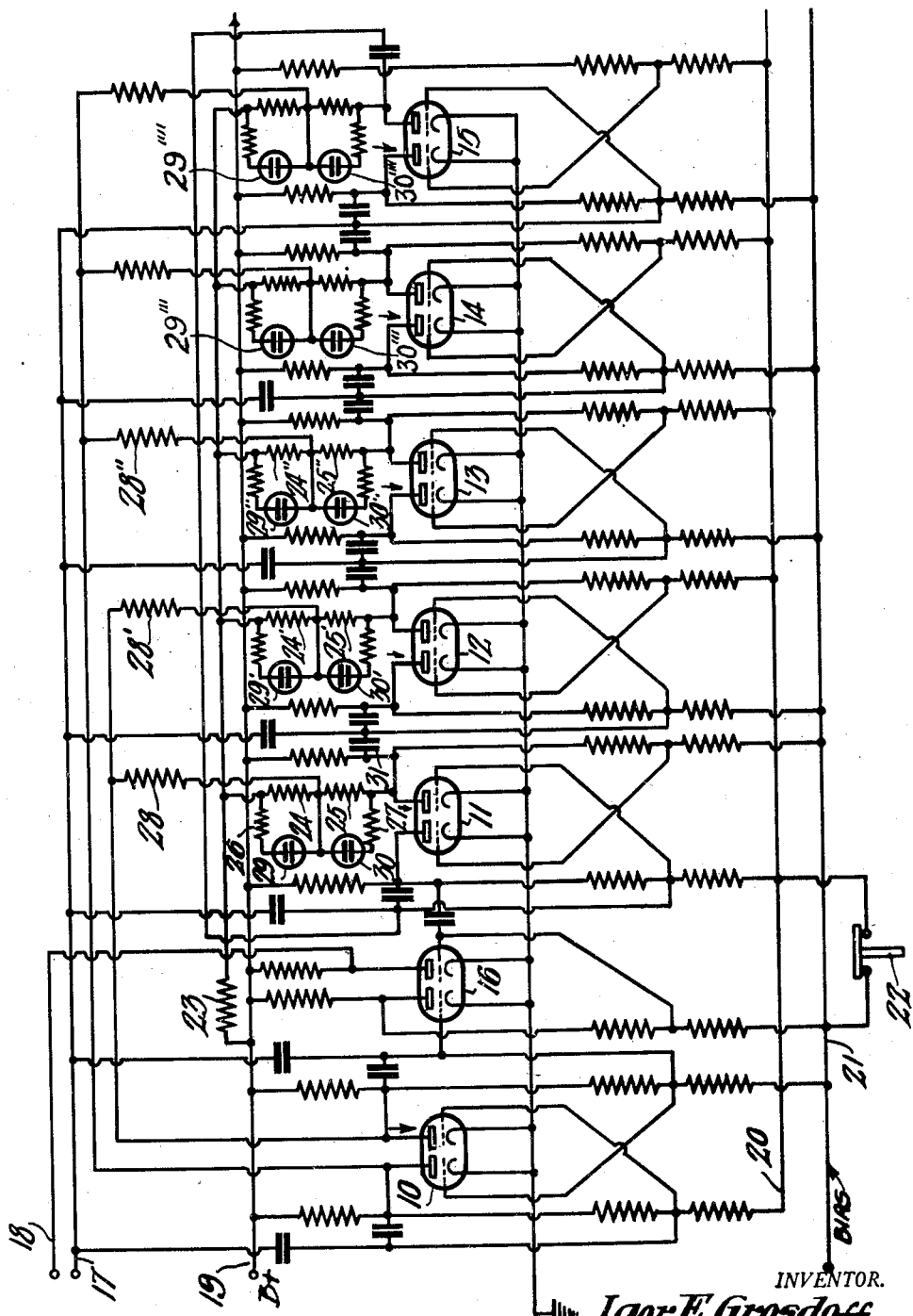
INVENTOR.
Igor E. Grosdoff
BY
ATTORNEY Patented Oct. 25, 1949

2,485,825

UNITED STATES PATENT OFFICE 2,485,825

COMPUTING CIRCUITS

Igor E. Grosdoff, Princeton, N. J., assignor to Radio Corporation of America, a corporation of Delaware Application January 18, 1944, Serial No. 518,771

7 Claims. (Cl. 235—92)

This invention relates to counting systems such as are utilized to register or indicate the total of a number of applied electrical pulses, and has for its principal object the provision of an improved circuit and method of operation whereby such total is made available at any stage in the operation of the circuit.

The improved indicating system of the present invention is illustrated as applied to a counting circuit of the multiple chain type, wherein one chain completes its cycle of operation upon the application of an even number of applied pulses and another chain completes it cycle of operation upon the application of an odd number of applied pulses. Each unit of one of the chains is provided with an indicating or registering circuit, these being identical for each unit of the chain.

This indicating circuit includes a network of resistors and a pair of neon lamps, so interconnected with the two chains that the lamps are lighted in a manner to indicate the number of electrical pulses applied to an input terminal of the circuit. It is the basis of the present invention and is hereinafter described in detail.

An important object of the invention is to provide an improved indicating system which is more flexible and permits more efficient operation than heretofore achieved.

The invention will be better understood from the following description considered in connection with the accompanying drawing, and its scope is indicated by the appended claims.

The single figure of the drawing is a wiring diagram of a multiple chain counting circuit which is provided with the improved indicating or registering system of the present invention.

The multiple chain computing circuit is of the type disclosed in a copending application, Serial No. 528,721, filed March 30, 1944.

This circuit includes one unit or chain which completes its cycle of operation in response to an even number of applied pulses, and another chain which completes its cycle of operation in response to an odd number of applied pulses. Connected between the two chains is a unit (in the present case, a multivibrator) which functions to deliver an output pulse each time an even number of cycles of the two chains have been completed. Thus, if one of the chains completes its cycle of operation on a count of two and the other chain completes its cycle of operation on a count of five, an output pulse is delivered for every tenth input pulse.

Stated more specifically, the multiple chain counting system includes one chain, shown as a single multivibrator 10 and another chain, shown as a plurality of multivibrators 11 to 15, connected in a closed loop. The pulses to be counted are applied through a lead 17 to the various multivibrator units as indicated and, for every ten of these applied pulses, one pulse is delivered from the unit 16 to the output lead 18.

With respect to the unit 16, it is apparent (1) that its right-hand grid is subjected to a positive potential when current is conducted by the right-hand side of the unit 11, and (2) that its left-hand grid is more negative when current is conducted by the right-hand side of the unit 10, as indicated by an arrow. Under these conditions, the right-hand side of the unit 16 becomes conductive and delivers a negative pulse at the lead 18.

Anode potential is applied to all the units through the lead 19, bias potential is applied through leads 20 and 21, and a reset switch 22 connected between these two leads is opened and closed to establish a standby condition with current in the various units as indicated by the arrows adjacent the anodes of the various units.

Each of the units 11 to 15 is provided with the same type of indicating unit. This unit depends for its operation on the relation between the potential of the right-hand anode of a unit 11, 12, 13, 14 or 15 and the potential of the right or left anode of the unit 10. The indicating unit of the multivibrator 11, for example, includes resistors 24 to 28 and lamps 29 and 30, which may be of the neon type.

With the right-hand sides of the multivibrators 10 and 11 conducting current as indicated by the arrows, the corresponding anodes are more negative and current flows from the lead 19 and a resistor 23 through the resistor 24, and thence by way of the resistors 25 and 28 to the two anodes. This results in a relatively high potential drop in the resistor 24 which transmits all the current delivered through the resistor 23 and a relatively low resistance drop in the resistor 25 which transmits only a part of the current delivered through the resistor 23. As a result, the lamp 29 (which indicates zero, ten or some multiple of ten applied pulses) is lighted.

With the left-hand side of 10 and the right-hand side of 11 conducting, the right-hand anode of 10 is at substantially the same potential as the lead 19, current is supplied from the lead through the resistors 28 and 24 to the resistor 25, the potential drop of the resistor 25 is relatively high, and the lamp 30 (which indicates a total of five or some multiple of five applied pulses) is lighted.

With the left-hand sides of 10 and 11 conducting, the right-hand anodes of 10 and 11 are at substantially the same potential as the lead 19, little or no potential is applied to the indicating unit, and neither the lamp 29 nor the lamp 30 is lighted.

With the right-hand side of 10 and the left-hand side of 11 conducting, current flows through 23, 24 and 28. Under these conditions, the drop across 24 and 25 is not enough to light either of the lamps 29 and 30 because most of the voltage is consumed in 28. The resistors 26 and 27 function to extinguish the lamps and to prevent them from drawing excessive current.

The indicating units of the multivibrators 12 to 15 are identical with that of the multivibrator 11.

Successive pulses applied to the lead 17 function to transfer current back and forth between the two sides of the multivibrator 10; i. e., the first pulse transfers current to the left side, the second pulse transfers current back to the right side, etc.

The same pulses operate on the closed loop of multivibrators 11 to 15 in a well-known manner to shift current to and fro between the sides of these multivibrators. At any given time, the right-hand side of only one of these multivibrators is conducting current and this multivibrator is so sensitized that current is transferred to its left-hand side by the next applied pulse. When this occurs, a potential applied from the nonconducting of the leading multivibrator through a coupling capacitor 31 to the right-hand grid of the following multivibrator, functions to shift current to the right-hand side of the following multivibrator.

For example, the first applied pulse shifts current to the left sides of the units 10 and 11 and, as a result, current is shifted to the right side of the unit 12.

Under these conditions, the right-hand anode of the unit 12 is more negative, the right-hand anode of the unit 10 is more positive, current flows in parallel through the resistors 28' and 24' to the resistor 25' and the lamp 30' (which indicates a total of one or some multiple of one applied pulses) is lighted.

Application of a second applied pulse to the lead 17 results in the transfer of current to the right sides of 10, the left side of 12, and to the right side of 13. Under these conditions, the left-hand anode of 10 is more positive, the right-hand anode of 13 is more negative, current is supplied in parallel through the resistors 28'' and 24'' to the resistor 25'', and the lamp 30'' (which indicates a count of two applied pulses) is lighted.

Further steps in the operation of the improved indicating system are readily followed from the following tabulation which is self-explanatory:

| Pulse No. | Multivibrator No. and side drawing current | | | | | | Lamp Lighted |
|---|---|---|---|---|---|---|---|
| | 11 | 12 | 13 | 14 | 15 | 10 | |
| Standby | R | L | L | L | L | R | 29 |
| 1 | L | R | L | L | L | L | 30' |
| 2 | L | L | R | L | L | R | 30'' |
| 3 | L | L | L | R | L | L | 29''' |
| 4 | L | L | L | L | R | R | 30'''' |
| 5 | R | L | L | L | L | L | 30 |
| 6 | L | R | L | L | L | R | 29' |
| 7 | L | L | R | L | L | L | 29'' |
| 8 | L | L | L | R | L | R | 30''' |
| 9 | L | L | L | L | R | L | 29'''' |
| 10 | R | L | L | L | L | R | 29 |
| 11 | L | R | L | L | L | L | 30' |
| 12 | L | L | R | L | L | R | 30'' |

It will be noted that some of the resistors 28 are connected to the right anode of 10 and that others are connected to the left anode. This type of connection is advantageous in that it divides the load between the two anodes. It is obvious, however, that any distribution other than that shown is practical, and that all the resistors may be connected to a single anode if desired. It should be understood that the single unit chain may be replaced by a plural unit chain, including any number of units required to produce the desired fractional count at the output terminal.

I claim as my invention:

1. The combination of a plurality of multivibrator units each including a pair of anodes and a pair of control electrodes and all arranged in groups the first of which completes its cycle of operation in response to an even number of applied pulses and the second of which completes its cycle of operation in response to an odd number of pulses, means for applying pulses to said electrodes, means for applying potential to said anodes, different pairs of impedance elements each connected between said potential applying means and an anode of a different multivibrator of said second group, an impedance element connected between the junctions of said pairs of impedance elements and an anode of said first group, and means connected between said groups to deliver a pulse in response to the completion of a predetermined number of cycles of said second group.

2. The combination of a plurality of multivibrator units each including a pair of anodes and a pair of control electrodes and all arranged in groups the first of which completes its cycle of operation in response to an even number of applied pulses and the second of which completes its cycle of operation in response to an odd number of pulses, means for applying pulses to said electrodes, means for applying potential to said anodes, different pairs of impedance elements each connected between said potential applying means and an anode of a different multivibrator of said second group, an impedance element connected between the junctions of said pairs of impedance elements and an anode of said first group, means connected between said groups to deliver a pulse in response to the completion of a predetermined number of cycles of said second group, and separate indicators each responsive to the potential of a different impedance element of said pairs of impedance elements.

3. The combination of first and second trigger circuit units each including a pair of electron discharge elements having their anodes and control grids cross-connected so that current is conducted only by one or the other of said elements, means for supplying current to said anodes, means including a pair of impedance elements connected between said current supply means and the first anode of the first of said units, and an impedance element connected between the junction of said pair of impedance elements and the first anode of said second unit, whereby the voltage drop of one impedance element of said pair is made to predominate when the first anode of said second unit is conducting current and the voltage drop of the other impedance element of said pair is made to predominate when the second anode of said second unit is conducting current.

4. The combination of first and second trigger circuit units each including a pair of electron discharge elements having their anodes and control grids cross-connected so that current is conducted only by one or the other of said elements, means for supplying current to said anodes, means including a pair of impedance elements connected between said current supply means and the first anode of the first of said units, and an impedance element connected between the junction of said pair of impedance elements and the first anode of said second unit, whereby the voltage drop of one impedance element of said pair is made to predominate when the first anode of said second unit is conducting current and the voltage drop of the other impedance element of said pair is made to predominate when the second anode of said second unit is conducting current and means for detecting the relation between the voltage drops of the impedance elements of said pairs.

5. The combination of first and second trigger circuit units each including a pair of electron discharge elements having their anodes and control grids cross-connected so that current is conducted only by one or the other of said elements, means for supplying current to said anodes, means including a pair of impedance elements connected between said current supply means and the first anode of the first of said units, and an impedance element connected between the junction of said pair of impedance elements and the first anode of said second unit, means for applying the same pulse to all of said grids, and means connected between the second anode of said first unit and the first anode of said second unit for delivering an output pulse in response to predetermined current conductive conditions of said first and second units.

6. The combination of first and second trigger circuit units each including a pair of electron discharge elements having their anodes and control grids cross-connected so that current is conducted only by one or the other of said elements, means for supplying current to said anodes, means including a pair of impedance elements connected between said current supply means and the first anode of the first of said units, and an impedance element connected between the junction of said pair of impedance elements and the first anode of said second unit, a third trigger circuit unit having its control grids connected respectively to the second anode of said first unit and to the first anode of said second unit, and an output lead connected only to one anode of said third trigger circuit.

7. The combination of first and second trigger circuit units each including a pair of electron discharge elements having their anodes and control grids cross-connected so that current is conducted only by one or the other of said elements, means for supplying current to said anodes, means including a pair of impedance elements connected between said current supply means and the first anode of the first of said unit, and an impedance element connected between the junction of said pair of impedance elements and the first anode of said second unit, a third trigger circuit unit having its control grids connected respectively to the second anode of said first unit and to the first anode of said second unit, an output lead connected only to one anode of said third trigger circuit, and a pulse input lead connected to all of said grids.

IGOR E. GROSDOFF.

REFERENCES CITED

The following references are of record in the file of this patent:

UNITED STATES PATENTS

| Number | Name | Date |
| --- | --- | --- |
| 2,067,151 | Dicke | Jan. 5, 1937 |
| 2,258,943 | Bedford | Oct. 14, 1941 |
| 2,310,105 | Michel | Feb. 2, 1943 |
| 2,342,753 | Pearson | Feb. 29, 1944 |
| 2,348,016 | Michel | May 2, 1944 |
| 2,404,047 | Flory et al. | July 16, 1946 |

OTHER REFERENCES

Review of Scientific Instruments, vol. 8, November 1937, pages 414–416.

"A Four Tube Counter Decade," by Potter, Electronics, June 1944, page 110.